(12) United States Patent
Stokes et al.

(10) Patent No.: US 8,809,435 B2
(45) Date of Patent: Aug. 19, 2014

(54) PROCESS ENHANCEMENT VIA STIMULI RESPONSIVE PARTICLE SURFACES

(75) Inventors: Kristoffer K Stokes, Charlotte, NC (US); Michael C Berg, Baltimore, MD (US); Joseph L Lenhart, Port Deposit, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/472,562

(22) Filed: May 16, 2012

(65) Prior Publication Data

US 2013/0310500 A1 Nov. 21, 2013

(51) Int. Cl.
| | | |
|---|---|---|
| *C08K 3/36* | (2006.01) | |
| *C08F 8/30* | (2006.01) | |
| *C09D 183/00* | (2006.01) | |
| *C23C 18/00* | (2006.01) | |
| *C08G 77/26* | (2006.01) | |
| *C08G 77/388* | (2006.01) | |

(52) U.S. Cl.
USPC ............. 524/430; 524/262; 525/451; 528/38; 106/287.11

(58) Field of Classification Search
USPC .............. 524/430, 262; 525/451; 106/287.11; 528/38
See application file for complete search history.

(56) References Cited

U.S. PATENT DOCUMENTS

| | | |
|---|---|---|
| 4,458,066 A | 7/1984 | Caruthers et al. |
| 5,132,418 A | 7/1992 | Caruthers et al. |
| 5,830,655 A | 11/1998 | Monforte et al. |
| 6,599,631 B2 | 7/2003 | Kambe et al. |
| 7,053,233 B2 | 5/2006 | Tonomura et al. |
| 2008/0028983 A1 | 2/2008 | Briehn et al. |
| 2008/0262169 A1 | 10/2008 | Pfeiffer et al. |
| 2009/0181097 A1 | 7/2009 | Stevens et al. |
| 2010/0010170 A1 * | 1/2010 | Prenzel et al. ................ 525/451 |

FOREIGN PATENT DOCUMENTS

| | | |
|---|---|---|
| JP | 3414134 B2 | 6/2003 |
| JP | 2004-18795 A | 1/2004 |

OTHER PUBLICATIONS

D. M. Shendage, R. Frohlich, and G. Haufe; Highly Efficient Stereoconservative Amidation and Deamidation of a-Amino Acids, Organic Letters, 2004, vol. 6, No. 21, p. 3675-3678.*

* cited by examiner

*Primary Examiner* — Ling Choi
*Assistant Examiner* — Ronald Grinsted
(74) *Attorney, Agent, or Firm* — Robert Thompson

(57) ABSTRACT

Methods for enhancing the processing of a polymer composite are provided herein. in some embodiments, a method for enhancing the processing of a polymer composite may include masking a at least one functional group on a surface of a particle by using a at least one protective group; mixing the particles into a polymer to form a composite; processing the composite; and applying a at least one stimulus to the composite during the processing of the composite or after processing of the composite is complete in order to remove the at least one protective group from the functional group.

17 Claims, 4 Drawing Sheets

US 8,809,435 B2

PROCESS ENHANCEMENT VIA STIMULI RESPONSIVE PARTICLE SURFACES

GOVERNMENT INTEREST

Governmental Interest—The invention described herein may be manufactured, used and licensed by or for the U.S. Government.

FIELD OF USE

Embodiments of the present invention generally relate to the processing of composites and, more particularly, to a method of enhancing the processing of composites.

BACKGROUND

In a polymer composite, a strong interaction, such as a hydrogen or covalent bond, is often desired between a particle filler and the polymer material within the composite. However, this strong bonding causes a significant premature rise in viscosity as the particle filler begins to bond with the polymer material in the composite before the particle filler can be sufficiently dispersed within the composite. The increase in viscosity heightens the difficulty of processing the polymer composite. In addition, the functionality on the particle filler that causes a strong particle-polymer interaction can often simultaneously cause a strong particle-particle interaction which leads to particle agglomeration and heightens the difficulty of processing the polymer composite due to an inability to adequately disperse the particles in the polymer.

Therefore, there is a need in the art for an improved method of processing composites.

BRIEF SUMMARY

Embodiments of the present invention relate to methods for enhancing the processing of a polymer composite. In some embodiments a method of enhancing the processing of a polymer composite may include masking a at least one functional group on a surface of a particle by using a at least one protective group; mixing the particles into a polymer to form a composite; processing the composite; and applying a at least one stimulus to the composite during the processing of the composite or after processing of the composite is complete in order to remove the at least one protective group from the functional group.

In some embodiments, a method of enhancing the processing of at least one of a polymer melt, a pre-polymer formulation, or a monomer solution, may include masking at least one of an amine, a carboxylic acid, an alcohol, or a thiol on a surface of a particle by using at least one of t-butylcarbamate, 1-adamantylcarbamate, vinyl carbamate, or di-tert-butyl-dicarbonate; mixing the particles into a polymer to form a composite; processing the composite; and applying at least one of light, heat, or an acid catalyst to the composite during the processing of the composite or after processing of the composite is complete in order to remove the at least one of t-butylcarbamate, 1-adamantylcarbamate, vinyl carbamate, or di-tert-butyl-dicarbonate from the at least one of amine, carboxylic acid, alcohol, or thiol.

In some embodiments, a method of enhancing the processing of a polymer composite, may include masking an amine on a surface of a silica particle by using di-tert-butyl-dicarbonate; mixing the particles into a polymer to form a composite; processing the composite; and applying at least one of light, heat, or an acid catalyst to the composite during the processing of the composite or after processing of the composite is complete in order to remove the di-tert-butyl-dicarbonate from the amine.

Other and further embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise a method and apparatus for enhancing the processing of a polymer composite by forming a switchable coating on the surface of a filler particle.

Figure 1:
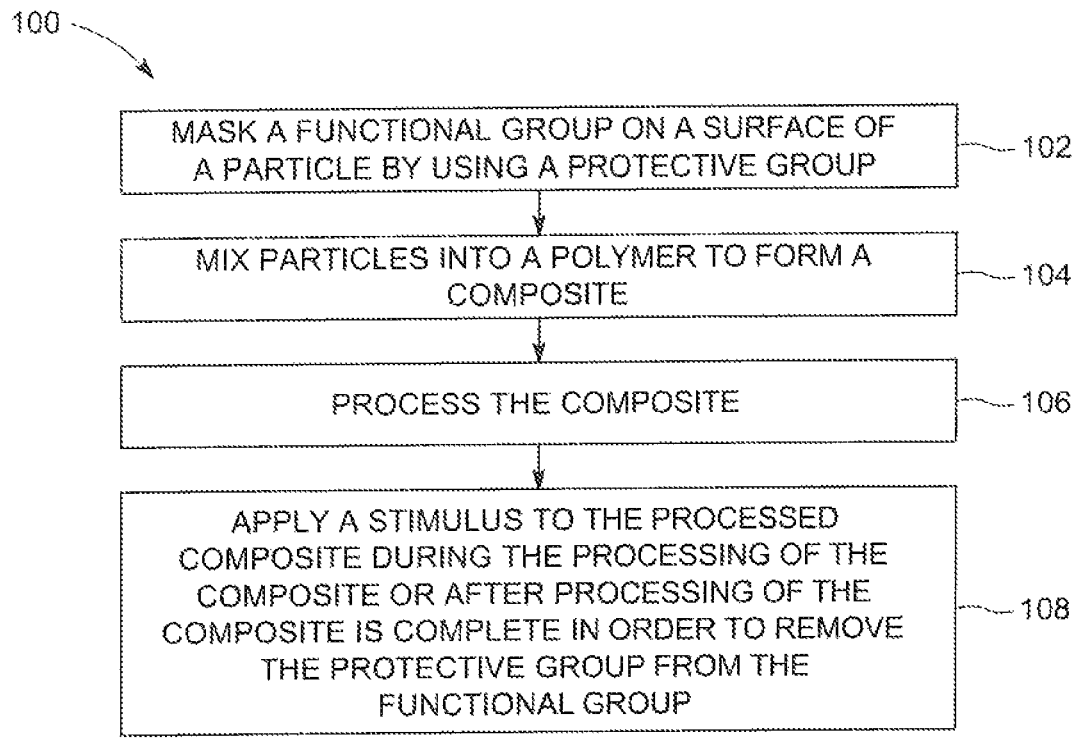
FIG. 1 depicts a flow diagram of a method for enhancing the processing of composites in accordance with some embodiments of the present invention.

FIG. 1 depicts a flow diagram of a method 100 for enhancing the processing of composites in accordance with some embodiments of the present invention. The method 100 starts at step 102 by masking a at least one functional group on the surface of a particle by using at least one protective group. In some embodiments, the functional group may comprise amines, carboxylic acids, alcohols, and thiols. In some embodiments, the particle may be a polymeric particle that contains one of the above functional groups. In some embodiments, the particle may be surface-modified to contain one of the above functional groups. In some embodiments, the particle is modified with a coupling agent containing an amine, hydroxyl, thiol, or a carboxylic acid. Examples of coupling agents include but is not limited to silane coupling agents; thiol and non-thiol based self-assembled monolayers; block, graft, and random copolymers where one monomers bonds with the filler and other monomers contain an amine, hydroxyl, carboxylic acid, or thiol species; polymer brushes grown from or grafted to the filler surface and terminated with amine, hydroxyl, carboxylic acid or thiol species. In some embodiments, multiple functional groups may be grafted to the particle.

The protecting group used in method 100 is dependent upon the functional group that is to be protected. In some embodiments, where the functional group is an amine, the protecting group may include substituted and unsubstituted carbamites such as t-butylcarbamate, 1-adamantylcarbamate, vinyl carbamate, or di-tert-butyl-dicarbonate. In some embodiments, where the functional group is a carboxyl group, the protecting group may include methyl esters or benzyl esters. In some embodiments, where the functional group is a thiol, the protecting group may include compounds such as tert-butylthioether. In some embodiments, where the functional group is a hydroxyl group, the protecting group may include various ether compounds such as methoxy-ethoxy-methyl ether, tert-butyl ether, methoxy-methyl ether, or tetrahydropyranyl ether. In some embodiments, multiple protecting groups may be bonded to multiple functional groups on the surface of a particle. A wide array of protecting group chemistries are available to those of skill in the art such as reviewed in *Protecting group chemistry* by Jeremy Robertson, Oxford University Press, 2000 or *Protecting Groups* by Philip J. Kocienski, Thieme, 2005. These citations are incorporated by reference for their teachings on protecting groups, protection group coupling reactions, and protecting group release stimuli.

At 104, following the protection of the functional group, the particles, including particles with masked functional groups, are mixed into the desired composite. In some embodiments, the composite is a polymer melt, or a pre-polymer formulation, or a monomer. At 106, the composite is processed into its final form, which can include, for example, adhesive bonds; structural panels, beams, or other structural components; encapsulants, conformal coatings, and potting materials for electronic devices and sensors; flip-chip underfills; paints and protective coatings; or the like.

At 108, a at least one stimulus is applied to the composite material in order to cleave the bond between the at least one functional group and the at least one protecting group. This allows the functional group to create a strong bond with the polymer composite. Application of the stimulus may occur at various points. For example, in some embodiments, the stimulus is applied to the composite during processing of the composite. Alternatively, in some embodiments, the stimulus is applied to the composite after processing of the composite is complete. In some embodiments, the stimulus may consist of applying to the composite at least one of light, heat, or pH altering substance to the composite. In some embodiments, the pH altering substance may be a carboxylic acid, hydrochloric acid, nitric acid, acetic acid, p-toluenesulfonic acid or other similar acids or organic acids. In some embodiments, the pH altering substance may be an acidic species generated from photo-acid generators such as bis-(p-tert-butylphenyl) iodonium, perfluorooctane sulfonate, or the like. In some embodiments, the acidic species may be from acidic functional groups present in the polymer where the combination of processing temperature and acidic functionality in the polymer can be exploited to stimulate the deprotection reaction. In some embodiments, multiple stimuli may be applied to the composite material.

Figure 2A:
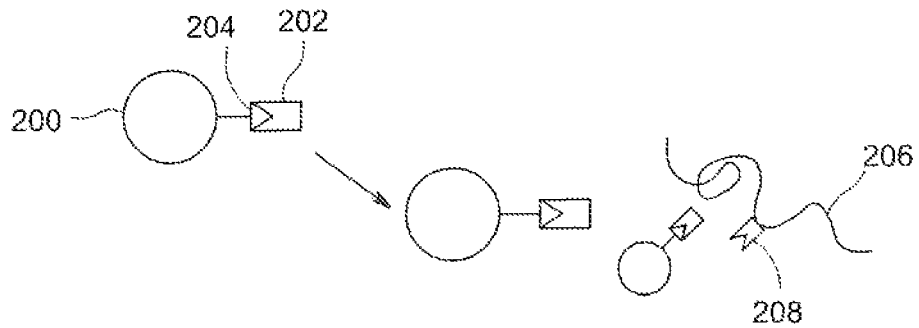
FIGS. 2A-2B depicts an illustrative view of a method for enhancing the processing of composites in accordance with some embodiments of the present invention.
Figure 2B:
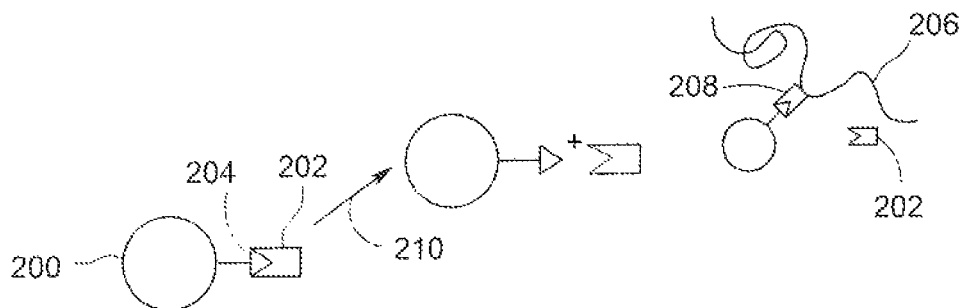

FIGS. 2A and 2B depict an illustrative view of a method for enhancing the processing of composites in accordance with some embodiments of the present invention. FIG. 2A depicts a particle 200 with a functional group 204 attached thereto. A protective group 202 is attached to the function group 204. The particle 200 is mixed into the composite polymer without the application of a stimulus. As a result, the protective group 202 remains coupled to the function group 204 and prevents the functional group from bonding to a receptor 208 on the polymer strand 206. In FIG. 2B, a stimulus 210 is applied to the particle 200 having a functional group 204 protected by a protecting group 202. The polymer strand 206 is present but not shown in FIG. 2A. The application of the stimulus 210 to the particle 200 having a functional group 204 protected by the protecting group 202 results in the protecting group 202 decoupling from the functional group 204 and thereby allowing the particle 200 to bond to the polymer strand 206.

Exemplary particles include, without limitation, silica, kaolin, carbon nanotubes, graphitic particles, graphene, carbon fiber, silica, glass, glass microballoons, nickel, gold, calcium carbonate, alumina, titanium dioxide, carbon black, barium carbonate, magnesium carbonate, barium titanate, quarts, clay based particulates, mica, talc, quantum dots, silver, cellulose based or other wood based fillers, and the like. Exemplary polymeric particles include without limitation, polystyrene, polymethylmethacrylate, poly-lactides, and the like. Exemplary polymers include both thermoplastic and thermosetting materials, polystyrene, polycarbonate, poly (methyl methacrylate, polyethylene, polypropylene, poly(tetrafluoro ethylene), poly (ethylene terephthalate), poly (ethylene naphthalate), poly (butylenes terephthalate), poly butadiene, polyamide, polyimide, poly (ether sulphone), epoxies, thermoplastic elastomers, silicones, butadiene and other rubbers, or polymers described above, functionalized with reactive groups like maleic anhydride, and the like.

Compounds used to form functional groups include without limitation, aminoalkylsilanes (such as aminopropyltriethoxysilane), aminochlorosilanes, amine functional polymers and block copolymers grafted to the particle surface, such as linear and branched polyethyleneimine, amine or hydroxyl functionalized coatings, monolayers, and self-assembled monolayer on metal, metal-oxide, or ceramic surfaces, amine or hydroxyl functionalized phosphonic acid ligands, amine or hydroxyl functionalized carboxylic or sulphonic acidic ligands, and the like. Spacing groups (such as propyl in aminopropyltriethoxysilane) can be, for example C2-C12 straight chain or branched alkyls. The compounds include the functional group to be protected, and groups (which can be the same) that form associations or bonds with the particles of strength sufficient for composite formation, as will be recognized in the art.

Figure 3A:
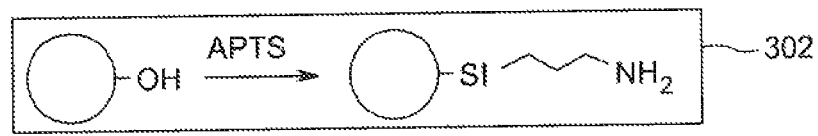
FIG. 3A-3C depicts a schematic of a specific embodiment of a method for enhancing the processing of composites in accordance with some embodiments of the present invention.
Figure 3B:
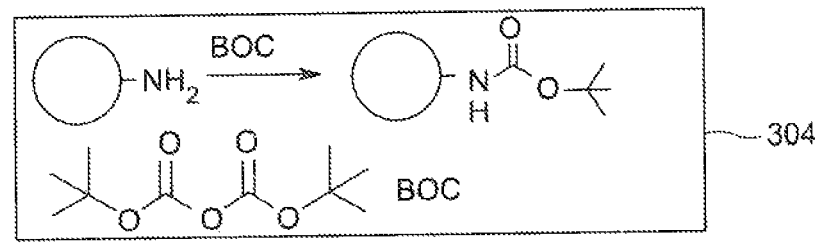
Figure 3C:
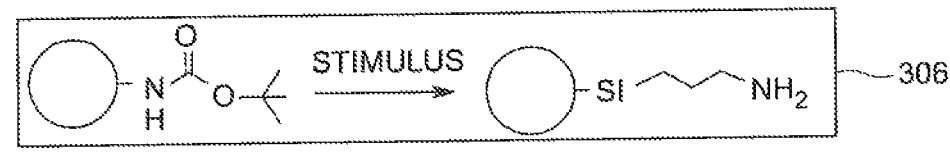

In a specific embodiment described herein, an amine functionality on silica is protected with di-tert-butyldicarbonate (BOC) to form a tert-butyl carbamate protected amine. FIG. 3A-3C depict a schematic of a specific embodiment of the protection strategy applied to silica particles. As depicted at 302, a aminopropyltriethoxysilane (APTS) is applied to the surface of the silica. At 304, di-tert-butyldicarbonate (BOC) is utilized to protect the amine functionality by forming a tert-butyl carbamate. Finally at 306, an external stimulus (light, heat, pH change) is applied to the composite to deprotect the tert-butyl carbamate and expose the amine functionality.

This protection chemistry can be de-protected to reform the amine by the application of acid, heat, or light (if a photo-acid generator is utilized to generate the acid upon light exposure). As mentioned above, a variety of different protection chemistries may be useful for protecting various groups including amines, hydroxyls, carboxyls, and thiols. In some embodiments, these protective groups are de-protected by the application of acid, heat, or light exposure that causes acid generation from a photo-acid generator. In some embodiments, the protective group can be deprotected by the application of base, heat, or light (if a photo-base generator is utilized to generate the base upon light exposure). An example of this base catalyzed deprotection chemistry includes the protection of an amine functionality with 9-fluorenylmethyl carbamate, or the protection of a hydroxyl functionality with 9-fluorenylmethyl carbonate, both of which can be deprotected under basic conditions. In some embodiments, light exposure can be the stimulus directly. An example of direct light stimulus is the protection of a hydroxyl functionality with o-nitrobenzyl ether, which deprotects to reveal the hydroxyl functionality upon ultraviolet light exposure. In some embodiments, the heat stimulus may be due to direct input of thermal energy into the composite from an external source such as electrical heating elements. In some embodiments, the heat stimulus may be due to polymer processing. Examples include exothermic reactions of curing resins such as an epoxy, viscous heating from flow in high viscosity solutions, or melt processing of thermoplastic based composites. In some embodiments, the heat stimulus may be generated by the application of external magnetic or electric fields which can cause heating of a composite that contains particles or fillers that have magnetic or electric field susceptibility. An example is a polymer filled with nickel, carbon nanotubes, or iron oxide particles.

Figure 4:
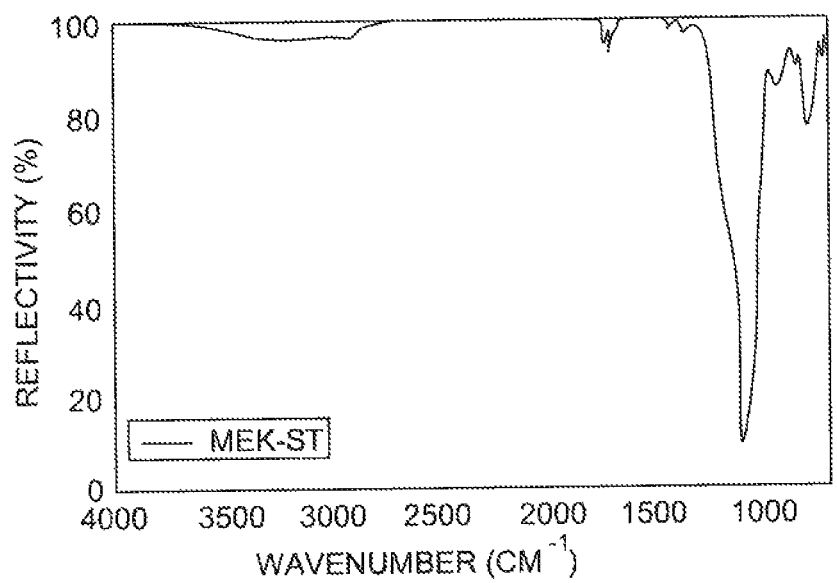
FIG. 4 depicts the chemical spectra of pure silica particles in accordance with some embodiments of the present invention.
Figure 5:
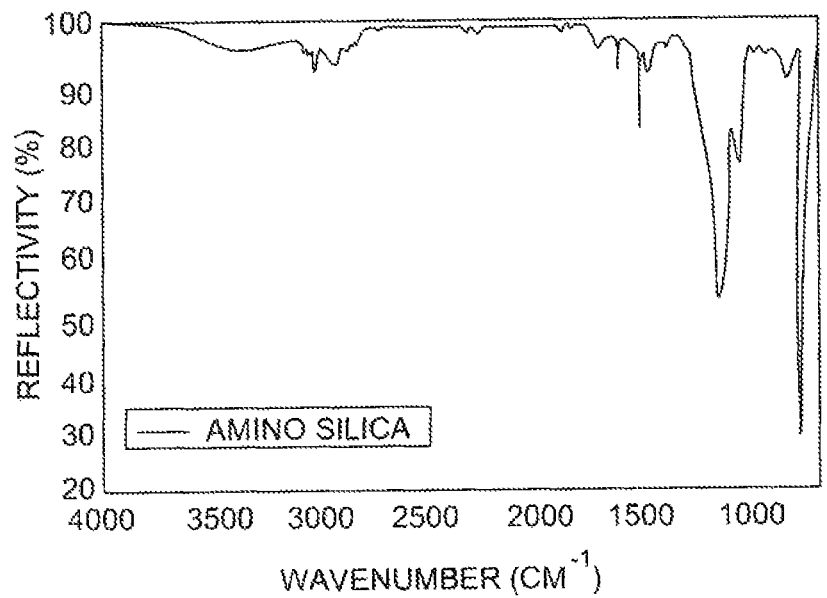
FIG. 5 depicts the chemical spectra of silica particles successfully modified with an amine functionality in accordance with some embodiments of the present invention.

FIG. 4 shows the chemical spectrum of the pure colloidal silica obtained using Fourier transformation infrared (FTIR) spectroscopy. FIG. 4 depicts a nearly featureless spectrum with a strong absorption at 1100 cm$^{-1}$. In some embodiments, in order to attach an amine functional group to silica particles, an approximately 30 wt % dispersion of 10-15 nm diameter silica nanoparticulate in methylethylketone is diluted with 400 ml of toluene. 13 grams of 3-aminopropyltriethoxysilane is added to the mixture. The mixture is then refluxed and purified by centrifugation, followed by supernatant decanting and resuspension in toluene, repeated three times. The successful inclusion of amine to the silica particles is evidenced by FIG. 5, wherein the FTIR spectrum depicts a broad absorption at 3500 cm$^{-1}$.

Figure 6:
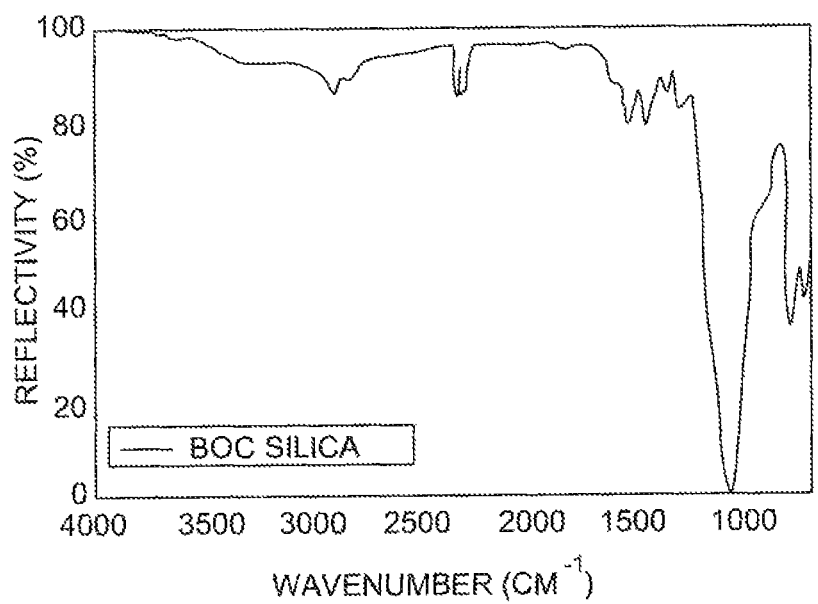
FIG. 6 depicts the chemical spectra of tert-butoxycarbamate protected amino silica particles in accordance with some embodiments of the present invention.

The amine coated silica particles obtained from this process are centrifuged and resuspended in 100 ml of methanol. 3.05 grams of di-tert-butyldicarbonate (BOC) and 0.1 ml of triethylamine are added and the mixture is stirred at 40° Celsius for two hours. Purification is achieved by three repetitions of a centrifuge, decant and resuspension cycle with toluene. FIG. 6 shows the amine group successfully protected by di-tert-butyldicarbonate, thereby changing the FTIR spectrum to shown an absorption at 1560 cm$^{-1}$, corresponding to the carbonyl absorption from the carbamate protective group.

Figure 7:
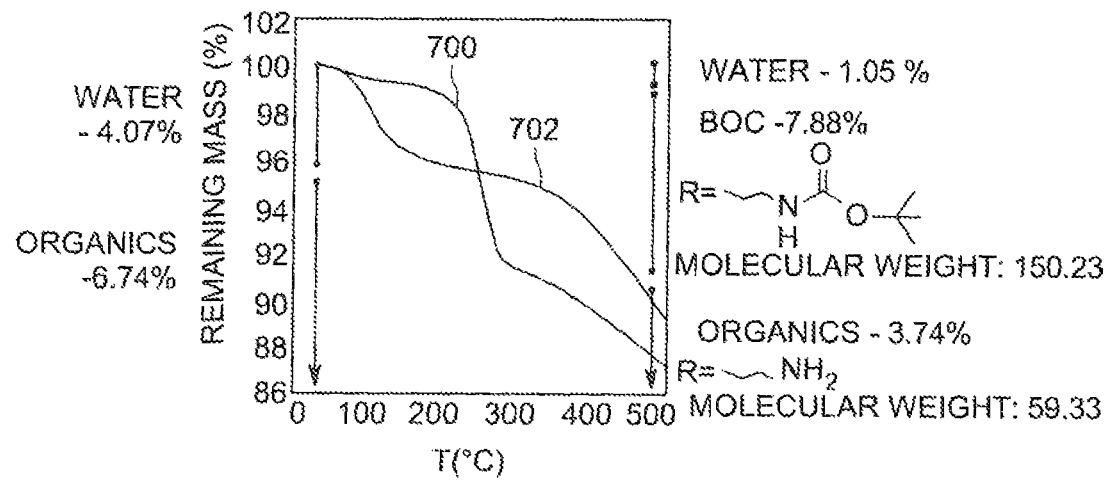
FIG. 7 depicts thermogravimetric analysis data from amine coated silica and tert-butoxycarbamate protected, amine coated silica in accordance with some embodiments of the present invention.

Thermogravimetric analysis (TGA) was also performed on the carbamate protected, amine coated silica particles. A sample mass of said particulate system was monitored under a nitrogen atmosphere while the temperature was ramped from about 35° Celsius to about 500° Celsius at a rate of about 20° Celsius per minute. FIG. 7 depicts thermogravimetric analysis data from an amine coated silica system 702 and BOC protected, amine coated silica system 700. An initial drop off in mass at about 100° Celsius in both systems is attributable to water loss. The greater hydrophilic nature of the amine coated particles allows them to maintain greater hydration on a mass ratio basis (4.07 wt % vs. 1.05 wt %) as compared to the hydrophobic BOC protected particles. At approximately 200° Celsius, a large thermal decomposition on the BOC protected system 700, representing approximately 7.8 wt % mass loss, corresponds to the protective group being removed from the amine on the surface of the silica particles by the heat in the TGA process. There is no similar mass loss on the amine coated silica system 702. Further decomposition of the organic layer on the silica surface can be seen at approximately 375° Celsius for the BOC protected system 700 and the amine coated silica system 702. The thermal decomposition of BOC represents approximately two-thirds of the total organic mass loss in the BOC protected particles. As the BOC protected group corresponds to about two-thirds of the total weight of organics in the protected system 700, there was near complete protection of the amine functionalities.

Figure 8:
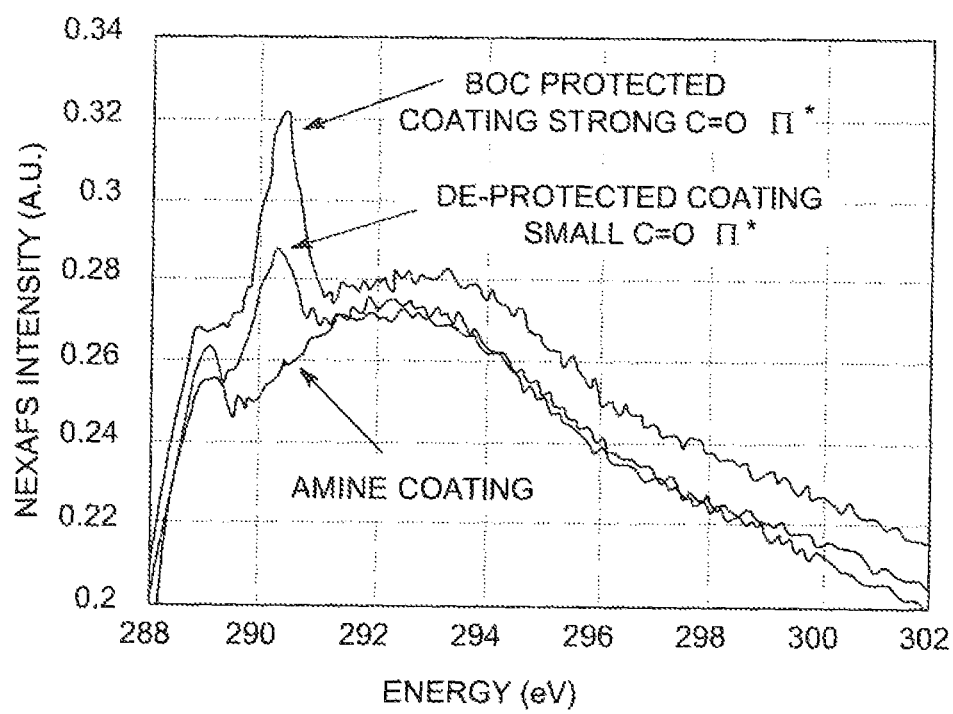
FIG. 8 depicts chemical analysis of the surface of silica that has been modified with amine, tert-butoxycarbamate protected amine, and tert-butoxycarbamate protected amine that was then thermally deprotected to regenerate the amine surface in accordance with some embodiments of the present invention.

FIG. 8 depicts a spectroscopic analysis of silica surfaces modified with an amine functional silane coating (amine coating), a tert-butoxycarbamate protected amine (BOC protected coating), and a tert-butoxycarbamate protected amine that was then thermally deprotected to regenerate the surface (de-protected coating). The peak at 290.2 eV is due to the carbonyl [C 1 s to π*C=O] transition on the protective group. With the amine coating no peak is observed at 290.2 eV. With the BOC protected coating a strong peak is observed at 290.2 eV. With the de-protected coating the peak at 290.2 eV is small, indicating that thermal treatment decomposed most of the BOC protective groups leaving residual amine groups on the surface. The spectroscopy was conducted using synchrotron based Near Edge X-ray Absorption Fine Structure at beamline U7A at the National Synchrotron Light Source at Brookhaven National Laboratory.

While the foregoing is directed to embodiments of the present invention, other and further embodiments of the invention may be devised without departing from the basic scope thereof.

The invention claimed is:

1. A method of enhancing the processing of a structural composite, comprising:
   masking at least one functional group on a surface of a particle by using at least one protective group;
   mixing the particles into a polymer to form the structural composite;
   processing the structural composite; and
   applying a stimulus of heat at a temperature greater than 120° C. to the structural composite during the processing of the structural composite or after processing of the structural composite is complete in order to remove the at least one protective group from the functional group.

2. The method of claim 1, wherein masking the at least one functional group further comprises at least one of reducing the viscosity of the structural composite or enhancing particle dispersion in the structural polymer structural composite.

3. The method of claim 1, wherein removing the at least one protective group from the at least one functional group further comprises at least one of increasing the viscosity of the structural composite or increasing the strength of the chemical or physical interactions between the polymer and particle in the structural composite.

4. The method of claim 1, wherein the at least one functional group comprises at least one of an amine, a carboxylic acid, an alcohol, or a thiol.

5. The method of claim 1, wherein the particle is a polymeric particle containing the functional group.

6. The method of claim 1, wherein the particle is at least one of a metal oxide or ceramic.

7. The method of claim 1, wherein the particle size ranges from about 1 nanometer to about 10 microns.

8. The method of claim 1, wherein the structural composite comprises at least one of a polymer melt, a pre-polymer formulation, or a monomer solution.

9. The method of claim 1, wherein the at least one stimulus comprises at least one of an application of light, an application of heat, or an adjustment of a pH of the structural composite.

10. The method of claim 1, wherein the functional group is provided by the reaction product of an aminoalkyl silane compound.

11. The method of claim 1, wherein the protecting group is at least one of t-butylcarbamate, 1-adamantylcarbamate, vinyl carbamate, or di-tert-butyl-dicarbonate.

12. The method of claim 1, wherein the stimulus to remove the protective group is the application of an add catalyst.

13. The method of claim 12, wherein an add is at least one of hydrochloric add, nitric acid, p-toluene sulfonic add or acetic acid.

14. The method of claim 12, wherein an add is an acidic, species generated from photo-acid generators.

15. A method of enhancing the processing of at least one of a polymer melt, a pre-polymer formulation, or a monomer solution, comprising:
   masking at least one of an amine, a carboxylic acid, an alcohol, or a thiol on a surface of a particle by using at least one of t-butylcarbamate, 1 adamantylcarbamate, vinyl carbamate, or di-tert-butyl-dicarbonate;
   mixing the particles into a polymer to form a structural composite;
   processing the structural composite; and
   applying at least one of light, heat, or an acid catalyst to the composite during the processing of the composite or after processing of the composite is complete in order to remove the at least one of t-butylcarbamate, 1-adamantylcarbamate, vinyl carbamate, or di-tert-butyl-dicarbonate from the at least one of amine, carboxylic acid, alcohol, or thiol.

16. A method of enhancing the processing of a polymer structural composite, comprising:
   masking an amine on a surface of a polymeric particle by using di-tart-butyl-dicarbonate;
   mixing the particles into a polymer to form a structural composite;
   processing, the composite; and
   applying heat at a temperature of greater than 120 CC, or an acid catalyst to the composite during the processing of the composite or after processing of the composite is complete in order to remove the di-tert-butyl-dicarbonate from the amine.

17. The method of claim 16, wherein the structural polymer composite comprises at least one of a polymer melt, a pre-polymer formulation, or a monomer solution.

* * * * *